United States Patent [19]
Pottala et al.

[11] Patent Number: 5,881,370
[45] Date of Patent: Mar. 9, 1999

[54] COMMUNICATION APPARATUS WITH AN AUTOMATICALLY CONFIGURED MULTIMODE TALK SWITCH AND METHOD OF OPERATION

[76] Inventors: James V. Pottala, 3111 NE. 51st St. Unit #406, Ft. Lauderdale, Fla. 33308; Robert B. Ford, 7422 NW. 75th St., Tamarac, Fla. 33321

[21] Appl. No.: 739,473

[22] Filed: Oct. 28, 1996

[51] Int. Cl.⁶ .............................. H04B 1/44; H04Q 7/32
[52] U.S. Cl. ..................... 455/78; 455/552; 370/296
[58] Field of Search .................. 455/74, 78, 552, 455/426, 550, 568, 79; 370/296

[56] References Cited

U.S. PATENT DOCUMENTS

| | | | |
|---|---|---|---|
| 4,654,883 | 3/1987 | Iwata | 381/380 |
| 4,790,002 | 12/1988 | D'Agosto, III et al. | 379/70 |
| 4,969,180 | 11/1990 | Watterson et al. | 379/56.1 |
| 5,191,602 | 3/1993 | Regen et al. | 455/568 |
| 5,450,618 | 9/1995 | Naddell et al. | 370/296 |
| 5,557,653 | 9/1996 | Paterson et al. | 455/568 |

FOREIGN PATENT DOCUMENTS 6-97852 4/1994 Japan.
8-98237 4/1996 Japan.

*Primary Examiner*—Andrew M. Dolinar
*Attorney, Agent, or Firm*—Andrew S. Fuller

[57] ABSTRACT

A communication apparatus (100) includes an automatically configured multimode talk switch (154). The communication apparatus (100) can be operated in a simplex communication mode, for receive or transmit operations, and a duplex communication mode, for simultaneous receive and transmit operations. The switch (154) is automatically configured as a push-to-talk momentary switch when the communication apparatus operates in the simplex communication mode (232, 235), and automatically configured as an on-hook/off-hook switch, when the communication apparatus operates in the duplex communication mode (242,245).

15 Claims, 4 Drawing Sheets

COMMUNICATION APPARATUS WITH AN AUTOMATICALLY CONFIGURED MULTIMODE TALK SWITCH AND METHOD OF OPERATION

TECHNICAL FIELD

This invention relates in general to radio communication devices, and more particularly, to control accessories for radio communication devices.

BACKGROUND

Headsets, speaker microphones, and similar audio accessories, enable convenient operation of a communication device, such as a portable telephone or two-way radio. A headset is generally connected to the communication device via a port that couples receive and transmit voice signal lines. The headset typically includes a headphone or earpiece speaker, and a microphone, which enable a user to hear and respond to voice communications. The headset may include controls for volume, on/off operation, and other functions. However, operation of the communication device to initiate and answer calls generally requires access to a control area on the communication device.

Handheld speaker microphones are often associated with two-way radios that operate in dispatch or simplex mode. This accessory is popular with users requiring handheld control of a main communication unit be mounted or otherwise attached to a support structure. A push-to-talk button on the speaker microphone functions to enable the microphone and initiate communications via the associated two-way radio. Other controls may be located on the speaker microphone device for conveniently operating the radio.

With the ever increasing combinations of features present in current communication devices, it is desirable to augment the functions available for radio controls to promote conveniences such as hands-free or remote operations. Preferably, a simplified approach to user controls would enable intuitive operation. Accordingly, an improved radio communication control accessory is required.

DETAILED DESCRIPTION OF THE PREFERRED EMBODIMENT

The present invention provides for a communication device with an automatically configured multimode talk switch. The communication device can be operated in a simplex communication mode, for receive or transmit operations, and a duplex communication mode, for simultaneous receive and transmit operations. The simplex communication mode is particularly suitable for dispatch or instant conferencing calls, and the duplex communication mode for telephone interconnect calls. When the communication device operates in the simplex mode, the switch is automatically configured as a momentary talk switch. In this case, the switch enables continuous transmission by the communication device while continuously engaged, and disables transmission when not engaged. When the communication device operates in duplex mode, the switch is automatically configured as an on-hook/off-hook switch. In this case, the switch enables continuous transmission upon a momentary engagement, and disables continuous transmission upon a subsequent successive momentary engagement.

Figure 1:
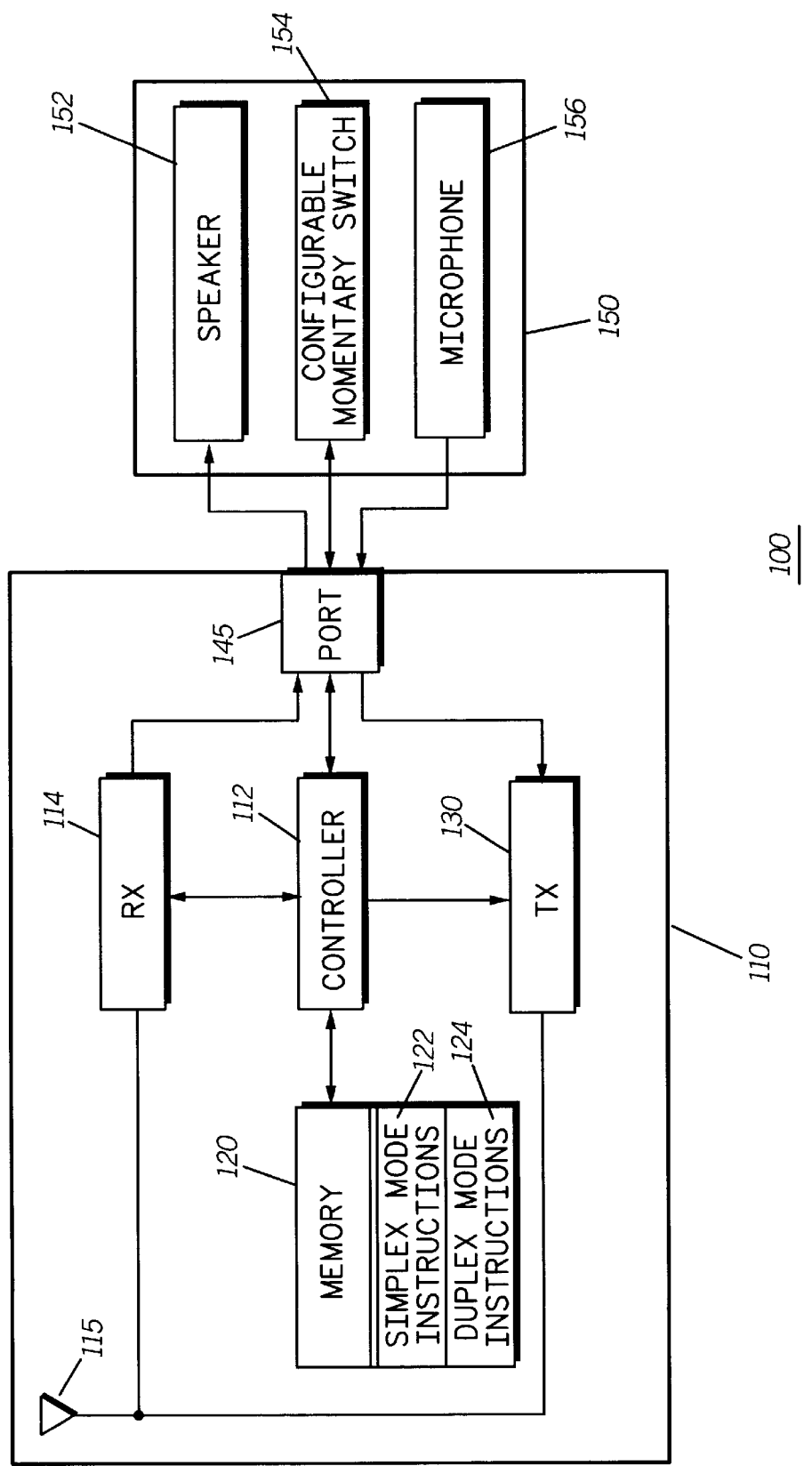
FIG. 1 is a simplified block diagram of a radio communication device and associated audio accessory, in accordance with the present invention.

FIG. 1 is a block diagram of a communication apparatus assembly 100, in accordance with the present invention. The assembly 100 includes a two-way communication device 110, which is preferably a portable radio transceiver 110 having a communication circuitry for communicating over a radio frequency (RF) channel. The transceiver 110 has a controller 112 that provides overall operational control. A receiver 114 receives communication signals via an antenna 115 under control of the controller 112. Similarly, a transmitter 130 transmits signals via the antenna 115 under control of the controller 112. The controller 112 operates according to instructions stored in a memory 120. The memory 120 includes instructions 124, 122 for selectively operating in a duplex communication mode enabling simultaneous receive and transmit operations, and a simplex communication mode enabling receive or transmit operations at a particular time. In the preferred embodiment, the simplex communication mode corresponds to a radio dispatch mode, and the duplex communication mode corresponds to a telephone interconnect mode. A port 145 provides a mechanism for coupling an audio or other accessory with radio communication control functions.

The assembly 100 further includes an audio accessory 150 coupled through the port 145 to the radio communication device 110 to enable remote operation of communication functions. The audio accessory is preferably a headset which is suitable for promoting hands-free operation. The audio accessory 150 includes a speaker 152, a microphone 156, and an operator actuated configurable momentary control switch 154. When coupled to radio, the switch 154 causes activation and deactivation of the speaker 152 and microphone 156 in conjunction with the operating mode of the radio. The control switch 154 is automatically configured as a push-to-talk momentary switch when the radio operates in the simplex communication mode, and automatically configured as an on-hook/off-hook switch, when the radio operates in the duplex communication mode. In the configuration mode corresponding to simplex operations, the switch, while continuously engaged, causes activation of the microphone and enables continuous transmission by the radio 110. In the configuration mode corresponding to duplex operations, the switch enables continuous transmission upon a momentary engagement, and disables continuous transmission upon a subsequent successive momentary engagement.

Figure 2:
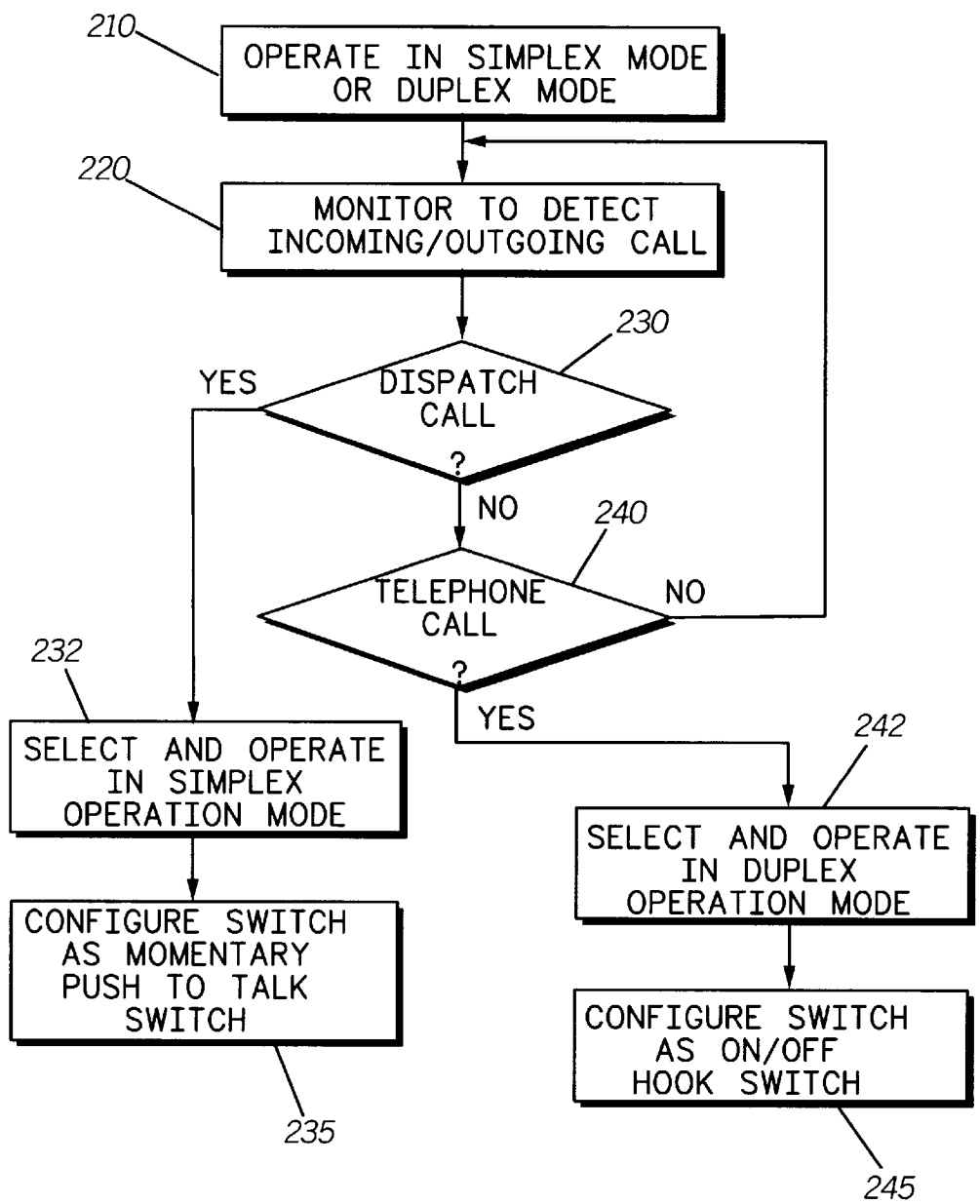
FIG. 2 is a flowchart of procedures for automatically configuring a control switch for radio communication control, in accordance with the present invention.

FIG. 2 is a flowchart of procedures 200 for automatically configuring the control switch, in accordance with the present invention. The radio alternatively operates in a simplex communication mode, such as for instant audio conferencing, and a duplex communication mode, such as for telephone communications, step 210. The radio may default to a particular mode, such as simplex mode for instant audio conferencing or dispatch calls. While operating in a particular mode, the radio monitors to detect incoming or outgoing calls, step 220. When an incoming or outgoing call indicates that the simplex mode is required, the radio selects this mode, and configures the control switch as a momentary push-to-talk switch, steps 230, 232, 235. When the call indicates that the duplex mode is required, the radio selects this mode, and configures the control switch as an on/off hook switch, steps 240, 242, 245.

Figure 3:
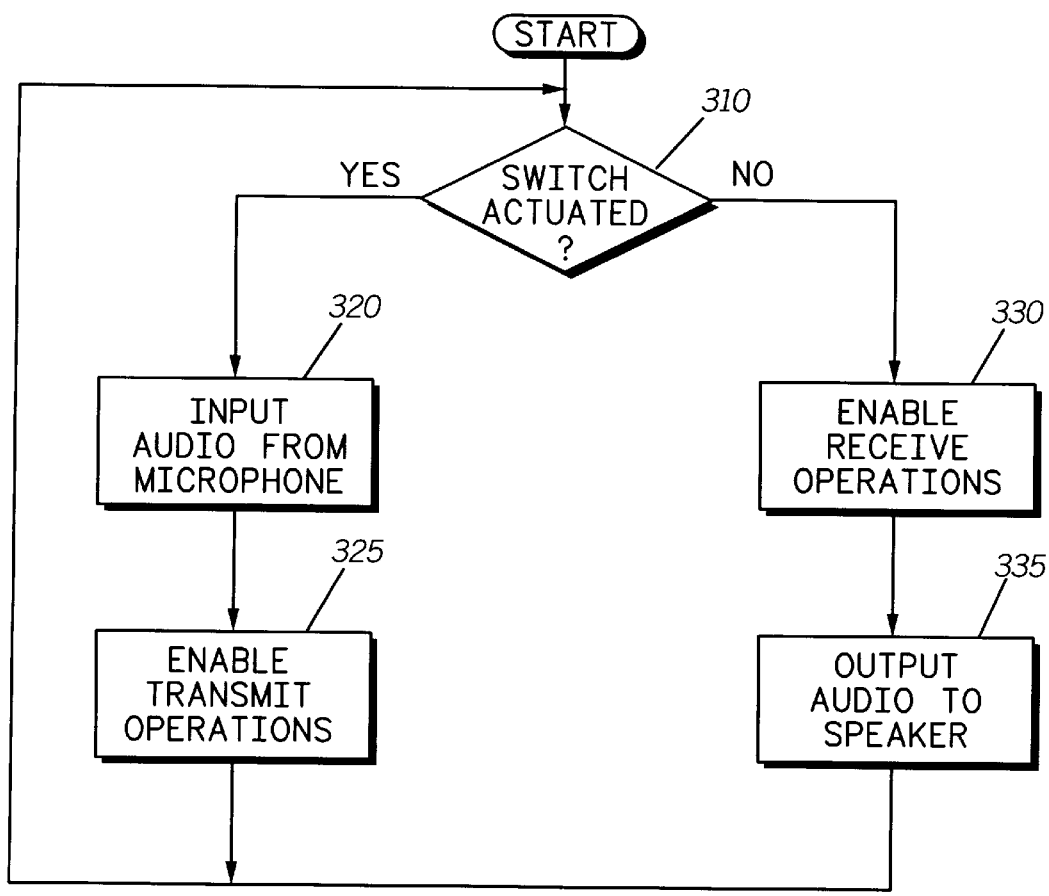
FIG. 3 is a flowchart of procedures for operating the control switch when the radio operates in a simplex communication mode, in accordance with the present invention.

FIG. 3 is a flowchart of procedures 300 for operating the control switch when the radio operates in the simplex communication mode, in accordance with the present invention. Here, the switch is appropriately configured as a momentary push-to-talk switch. When the switch is actuated, the microphone is activated such that audio input signals are received by the radio, steps 310, 320, and transmit operations are enabled, step 325. These steps are repeated while the switch is actuated. When the switch is not actuated, receive operations are enabled, steps 310, 330, and audio is outputted to the speaker, step 335.

Figure 4:
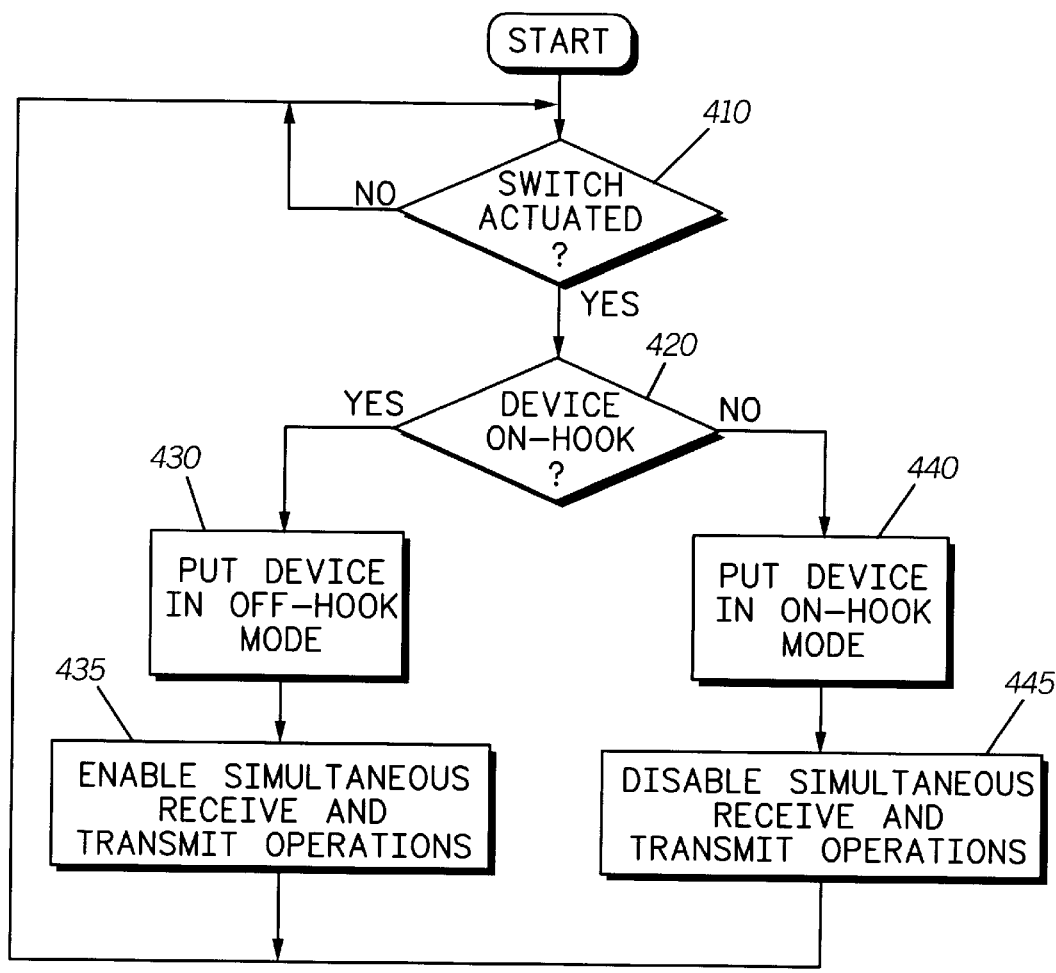
FIG. 4 is a flowchart of procedures for operating the control switch when the radio operates in a duplex communication mode, in accordance with the present invention.

FIG. 4 is a flowchart of procedures 400 for operating the control switch when the radio operates in the duplex communication mode, in accordance with the present invention. Here, the switch is appropriately configured as an on/off switch. When the switch is momentarily actuated, and the radio is on-hook, i.e., not engaged in duplex communications, the radio is placed in an off-hook mode, which enables simultaneous receive and transmit operations, steps 410, 420, 430, 435. In this case, the speaker and microphone are both activated. When the switch is momentarily actuated, and the radio is off-hook, i.e., already engaged in duplex communications, the radio is placed in an on-hook mode, which disables simultaneous receive and transmit operations, steps 410, 420, 440, 445.

The present invention provides significant advantages over the prior art. By automatically configuring a single multimode control switch according the operating mode of the radio, a simplified approach to user controls is provided that enables intuitive operation. When such a control switch is included as a radio control on an audio accessory, such as a headset, hands-free or other remote operation is made convenient.

What is claimed is:

1. A communication apparatus, comprising:
   a two-way communication device, the communication device being selectively operable in a duplex communication mode enabling simultaneous receive and transmit operations, and a simplex communication mode enabling receive or transmit operations at a particular time; and
   an audio accessory coupled to the communication device, the audio accessory comprising a control switch that is automatically configured as a push-to-talk momentary switch when the communication device operates in the simplex communication mode, and automatically configured as an on-hook/off-hook switch, when the communication device operates in the duplex communication mode.

2. The communication apparatus of claim 1, wherein audio accessory comprises a microphone, and the control switch selectively causes activation of the microphone.

3. The communication apparatus of claim 2, wherein the audio accessory comprises a speaker.

4. The communication apparatus of claim 2, wherein the audio accessory comprises a headset, and the control switch is coupled to the headset.

5. The communication apparatus of claim 1, wherein the simplex communication mode corresponds to a radio dispatch mode, and the duplex communication mode corresponds to a telephone interconnect mode.

6. A communication apparatus, comprising:
   a transceiver alternatively operable in first and second communication modes; and
   a momentary switch coupled to the transceiver, the switch having first and second configuration modes corresponding to the first and second communication modes, respectively;
   wherein, in the first configuration mode, the switch enables continuous transmission by the transceiver while the switch is continuously engaged, and in the second configuration mode, the switch enables continuous transmission upon a momentary engagement, and disables continuous transmission upon a subsequent successive momentary engagement.

7. The communication apparatus of claim 6, further comprising an audio accessory attached to the transceiver, wherein the audio accessory comprises the momentary switch.

8. The communication apparatus of claim 6, wherein the first communication mode corresponds to a simplex dispatch mode, and the second communication mode corresponds to a duplex telephone interconnect mode.

9. The communication apparatus of claim 6, wherein the first configuration mode configures the momentary switch as a push-to-talk switch, and the second configuration mode configures the momentary switch as an on-hook/off-hook switch.

10. In a radio telephone device having a simplex communication mode, and a duplex communication mode, and having an operator actuated control switch, a method comprising the steps of:
    operating the radio telephone device in one of the simplex communication mode, and the duplex communication mode;
    automatically configuring the switch as a momentary talk switch when operating in the simplex communication mode; and
    automatically configuring the momentary talk switch as an on/off hook switch when operating in the duplex communication mode.

11. The method of claim 10, wherein the step of operating the radio telephone device, comprises the steps of:
    monitoring to detect an incoming telephone call; and
    selecting the duplex communication mode upon detection of the incoming telephone call.

12. The method of claim 11, wherein the step of operating the radio telephone device, comprises the steps of:
    monitoring to detect an incoming dispatch call; and
    selecting the simplex communication mode upon detection of the incoming dispatch call.

13. The communication apparatus of claim 3, wherein the control switch causes activation and deactivation of the speaker and microphone, depending on whether the communication device operates in the simplex communication mode or the duplex communication mode.

14. The communication apparatus of claim 6, wherein the transceiver comprises communication circuitry for communicating over a radio frequency channel.

15. The communication apparatus of claim 6, wherein the transceiver is a radio-telephone device.

* * * * *